3,390,175
PROCESS FOR PURIFYING GLUTAMIC ACID

Miyoji Dazai, Yokohama-shi, Kanagawa-ken, and Masahiko Konishi, Kawasaki-shi, Kanagawa-ken, Japan, assignors to Ajinomoto Co., Inc., Tokyo, Japan
No Drawing. Filed Apr. 8, 1964, Ser. No. 358,367
Claims priority, application Japan, Apr. 16, 1963, 38/19,574
3 Claims. (Cl. 260—534)

The present invention relates to a method of purifying glutamic acid particularly synthetic glutamic acid, which is contaminated with impurities such as coloring matters or water-soluble organic compounds of high molecular weight.

It is generally advantageous to separate synthetic glutamic acid in the form of a sparingly soluble salt from a reaction mixture in which the glutamic acid was formed. The precipitated salt contains the aforementioned impurities, and the crystalline glutamic acid liberated from the salt is contaminated thereby. Glutamic acid crystallized directly from the reaction mixture contaminated even more heavily.

The present invention provides a method of obtaining crystalline, pure glutamic acid from an impure synthetic glutamic acid, a salt thereof or a solution thereof contaminated with the above-mentioned impurities. We have found that these impurities generally remain in the liquid phase, when a non-ionic or anionic surface active agent is present in an aqueous medium from which the glutamic acid is crystallized. The method is applicable not only to the crystallization of impure sparingly soluble glutamic acid salts but also to that of readily soluble glutamic acid salts and further to the crystallization of glutamic acid. When the pH of a glutamate solution is adjusted to the isoelectric point of glutamic acid, or a glutamic acid solution is supersaturated by cooling, partial evaporation or the like, the impurities remain in the liquid phase in the presence of a non-ionic or anionic surface active agent and do not accompany the crystallizing glutamic acid.

Synthetic glutamic acid is normally racemic and may be optically resolved by seeding method. We have found that the resolution yield can be greatly improved by removing the above-mentioned impurities from the reaction mixture.

The starting material for the method of the invention may be one of the sparingly soluble salts of glutamic acid such as the zinc, copper, cadmium, manganese, cobalt and calcium salts, a freely soluble salt such as the sodium and ammonium salts, or an inorganic acid addition salt such as the hydrochloride, sulfate, or phosphate of glutamic acid.

Any known methods for crystallizing glutamic acid from its supersaturated aqueous solution can be employed when a non-ionic or anionic surface active agent is present in the solution. The preferred amount of surface active agent is between 0.01–5% of the glutamic acid amount. Though various non-ionic and anionic surface active agents are useful, a monoalkali metal salt of a sulfate ester of a higher alcohol is preferred. A mere washing with water makes the glutamic acid crystals substantially pure.

Clear glutamic acid crystals free from coloring matter can be obtained.

EXAMPLE I

To 19.2 kg. of zinc glutamate dihydrate which had been obtained by converting acrylonitrile by hydroformylation and Strecker reactions to glutamic acid, and adding zinc sulfate to the liquid reaction mixture, there were added 5 g. of a non-ionic surface active agent ("Nonion HS 210," a polyoxyethylene alkylaryl ether) and 38.1 kg. of 20% sulfuric acid. The pH was 3.2. The racemic glutamic acid monohydrate thus crystallized was recovered by centrifuging, washed with water and dried to give 10.8 kg. of pure racemic glutamic acid monohydrate crystals.

The colouration of the crystals was one third of that of a racemic glutamic acid monohydrate crystallized in the absence of any surface active agent. The colouration of glutamic acid monohydrate crystallized under otherwise similar conditions with a cationic surface active agent ("Cortamine 86," a quaternary alkyl ammonia chloride) was better than that obtained without any surface active agent by a factor of about 1.8.

The three batches of racemic glutamic acid obtained with the non-ionic surface active agent, the cationic surface active agent and without any surface active agent were, respectively, subjected in the same way to physicochemical optical resolution with the following results.

| | L-isomer | | D-isomer | |
|---|---|---|---|---|
| Surface active agent | Relative yield | Optical purity, percent | Relative yield | Optical purity, percent, |
| None | 0.81 | 91.5 | 0.77 | 92.5 |
| Non-ionic | 1.00 | 95.3 | 1.00 | 95.0 |
| Cationic | 0.75 | 90.8 | 0.76 | 90.2 |

Similar tests were carried out with two other surface active agents, and the results were listed in the following table.

| | L-isomer | | D-isomer | |
|---|---|---|---|---|
| Surface active agent | Relative yield | Optical purity, percent | Relative yield | Optical purity, percent |
| "Triton X-100" [1] | 1.02 | 94.9 | 0.99 | 95.6 |
| "Nopco NAP" [2] | 0.73 | 91.1 | 0.77 | 89.9 |

[1] Non-ionic surface active agent, an alkyl aryl polyether alcohol.
[2] A cationic detergent (fatty amine salt, see U.S. Patents 2,206,928 and 2,340,881).

EXAMPLE II 18.9 kg. of copper glutamate dihydrate obtained from copper sulfate and racemic glutamic acid were mixed with 7 g. of an anionic surface active agent ("Monogen LH," a monosodium salt of a sulfate ester of higher alcohols, mainly lauryl alcohol) and 37.9 kg. of 20% sulfuric acid (pH 3.2). The racemic glutamic acid monohydrate thus crystallized was recovered by centrifuging, washed with water and dried.

The coloration of the crystals was about 1/2.5 as compared to a racemic glutamic acid monohydrate crystallized in the absence of any surface active agent and physiochemical optical resolution gave the results listed in the following table.

| | L-isomer | | D-isomer | |
|---|---|---|---|---|
| Surface active agent | Relative yield | Optical purity, percent | Relative yield | Optical purity, percent |
| None | 0.74 | 91.5 | 0.74 | 92.0 |
| Monogen LH | 1.00 | 94.0 | 0.98 | 94.4 |

Test with another anionic surface active agent ("Duponol WA," sodium lauryl sulfate) gave the following results:

L-isomer:
    Relative yield _____ 1.01
    Optical purity, percent _____ 94.2
D-isomer:
    Relative yield _____ 1.00
    Optical purity, percent _____ 95.0

EXAMPLE III

In a beaker of 300 ml. capacity 200 g. of water, 18.5 g. of sulfuric acid and 27.4 g. of zinc D-glutamate dihydrate were dissolved by stirring with an anionic surface active agent ("Sintlex," monosodium sperm alcohol sulfate) at more than 50° C., whereupon 3 g. of prism-like D-glutamic acid crystals in the β-form were added. To this slurry was added little by little with stirring over one hour another slurry obtained by mixing the 19.2 g. zinc D-glutamate dihydrate, 22 g. of water, while the temperature was kept at more than 50° C. D-glutamic acid was crystallized in the prism-like β-form while the mixture was cooled to 25° C., at which temperature the crystals were separated from the mother liquor, washed with water and dried to give 24 g. of D-glutamic acid. 10 g. of the D-glutamic acid were dissolved in enough water and sodium hydroxide to give 100 ml of a solution of about pH 7. The extinction of the solution was $-\log T = 0.02$ at 430 mμ. When 30 mg. of another anionic surface active agent ("Decresol OT," dioctyl ester of sodium sulfosuccinic acid was used instead of "Sintlex" under otherwise identical conditions, the extinction was $-\log T = 0.02$.

When cationic surface active agents "Cation BB" (trimethyl dodecyl ammonium chloride) or octadecyl oxymethylene pyridinium chloride were used, the D-glutamic acid solutions had extinctions of $-\log T = 0.12$ and 0.13, respectively. Without a surface active agent, the extinction of the D-glutamic acid solution was $-\log T = 0.07$.

EXAMPLE IV

To 55 kg. of an aqueous alkaline solution of sodium glutamate (containing 20% of racemic glutamic acid and 20.1% of sodium hydroxide) was added 10 g. of an anionic surface active agent ("Sintlex," a monosodium salt of a sperm alcohol sulfate) and the pH was adjusted to 3.2 with 60% sulfuric acid. The resulting crystals of glutamic acid monohydrate were centrifuged, washed with water and dried. The coloration of the crystals was about one fourth of that of glutamic acid monohydrate obtained in the same manner but without surface active agent. When subjected to physicochemical optical resolution, the two batches of crystals gave the following results.

| Surface active agent | L-isomer | | D-isomer | |
|---|---|---|---|---|
| | Relative yield | Optical purity, percent | Relative yield | Optical purity, percent |
| No | 0.42 | 88.0 | 0.45 | 87.1 |
| Yes | 1.00 | 95.4 | 1.02 | 95.0 |

Optical resolution of racemic glutamic acid obtained in the presence of "Decresol OT" gave the following results:

L-isomer:
  Relative yield _____ 1.00
  Optical purity, percent _____ 94.8
D-isomer:
  Relative yield _____ 0.98
  Optical purity, percent _____ 95.3

What we claim is:
1. A method of purifying crude glutamic acid which comprises
   (a) preparing an aqueous solution supersaturated with said glutamic acid and containing 0.01 to 5 percent of an anionic or a non-ionic surface active agent selected from the group consisting of alkali metal salts of sulfates of higher alcohols, alkali metal salts of dialkyl esters of sulfosuccinic acid, polyoxyalkylene alkyl aryl ethers, and alkyl aryl polyether alcohols;
   (b) permitting said glutamic acid to crystallize from said solution; and
   (c) separating the crystals of glutamic acid from the remaining solution.
2. A method as set forth in claim 1, wherein said solution has a pH value of substantially 3.2.
3. A method as set forth in claim 1, wherein said glutamic acid is racemic.

References Cited

UNITED STATES PATENTS 2,681,927    6/1954    McCollum _____ 260—534

LORRAINE A. WEINBERGER, *Primary Examiner.*

A. P. HALLUIN, *Assistant Examiner.*